(12) United States Patent
Tani et al.

(10) Patent No.: US 8,204,342 B2
(45) Date of Patent: Jun. 19, 2012

(54) IMAGE PROCESSOR

(75) Inventors: Yujiro Tani, Osaka (JP); Atsushi Uchiyama, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 644 days.

(21) Appl. No.: 12/401,132

(22) Filed: Mar. 10, 2009

(65) Prior Publication Data

US 2010/0135589 A1 Jun. 3, 2010

(30) Foreign Application Priority Data

Mar. 12, 2008 (JP) ................................ 2008-061990

(51) Int. Cl.
*G06K 9/60* (2006.01)
(52) U.S. Cl. ........ 382/307; 382/232; 382/260; 382/303; 382/304; 348/398.1; 348/608; 707/737; 707/754
(58) Field of Classification Search .................. 382/232, 382/260, 303, 304, 307; 348/398.1, 608; 707/737, 754
See application file for complete search history.

(56) References Cited

U.S. PATENT DOCUMENTS

| 5,499,111 | A  | * | 3/1996  | Sato et al.      | 382/252    |
|-----------|----|---|---------|------------------|------------|
| 5,818,957 | A  | * | 10/1998 | Mammone          | 382/128    |
| 5,845,083 | A  | * | 12/1998 | Hamadani et al.  | 709/231    |
| 6,671,418 | B2 | * | 12/2003 | Rengakuji et al. | 382/264    |
| 6,693,965 | B1 | * | 2/2004  | Inoue et al.     | 375/240.19 |
| 7,072,411 | B1 | * | 7/2006  | Dollard          | 375/260    |
| 7,319,775 | B2 | * | 1/2008  | Sharma et al.    | 382/100    |
| 7,324,702 | B2 | * | 1/2008  | Takano et al.    | 382/274    |
| 7,373,010 | B2 | * | 5/2008  | Lesellier et al. | 382/254    |
| 7,480,393 | B2 | * | 1/2009  | Gustafson et al. | 382/100    |
| 7,483,595 | B2 | * | 1/2009  | Keithley et al.  | 382/307    |
| 7,583,851 | B2 | * | 9/2009  | Kudo et al.      | 382/254    |
| 7,742,661 | B2 | * | 6/2010  | Chan et al.      | 382/305    |
| 2002/0061118 | A1 | * | 5/2002 | Tachibana et al. | 382/100   |
| 2002/0114491 | A1 | * | 8/2002 | Sharma et al.    | 382/100   |
| 2002/0131500 | A1 | * | 9/2002 | Gandhi et al.    | 375/240.16 |
| 2005/0094003 | A1 | * | 5/2005 | Thorell          | 348/241   |
| 2007/0098278 | A1 | * | 5/2007 | Sun et al.       | 382/236   |
| 2007/0113048 | A1 | * | 5/2007 | Royer et al.     | 712/34    |
| 2009/0167885 | A1 | * | 7/2009 | Okutomi et al.   | 348/222.1 |

OTHER PUBLICATIONS

Optimal Fir Pre- and Postfilters—signals, Malvar et al., IEEE, 0090-6778, 1998, pp. 67-74.*
Enhancement—Pre and Post- filtering, Hadar et al., SPIE, 0091-3286, 2001, pp. 193-199.*
A method—Optimal Filtering., Kim et al., Springer, LCNS 3333, 2004, pp. 135-142.*
U.S. Appl. No. 12/400,997, filed Mar. 10, 2009, Tani, et al.

(Continued)

*Primary Examiner* — Jayesh A Patel
(74) *Attorney, Agent, or Firm* — Oblon, Spivak, McClelland, Maier & Neustadt, L.L.P.

(57) ABSTRACT

An image processor includes a frequency transform unit performing frequency transform on a first pixel block as a target block, and a pre-filter performing prefiltering with a region which overlaps with plural unit regions for processing by the frequency transform unit as a unit region for processing, before frequency transform is performed. The pre-filter performs prefiltering on a second pixel block being a predetermined number of pixels each larger horizontally and vertically than the first pixel block as a target block. The pre-filter performs prefiltering sequentially on a plurality of second pixel blocks aligned horizontally. The number of pixel signals in a vertical direction within a group of pixel signals continuously inputted to the pre-filter for prefiltering is equal to the number of rows in the second pixel block.

4 Claims, 10 Drawing Sheets

OTHER PUBLICATIONS

U.S. Appl. No. 12/403,041, filed Mar. 12, 2009, Uchiyama, et al.
U.S. Appl. No. 12/402,817, filed Mar. 12, 2009, Uchiyama, et al.
"HD Photo-Photographic Still Image File Format", Nov. 7, 2006, 140 pages.

"Coding of Still Pictures-JBIG JPEG", ISO/IEC JTC 1/SC 29/WG1 N 4392, ISO/IEC CD 29199-2, Dec. 19, 2007, 151 pages.

* cited by examiner

FIG. 9A
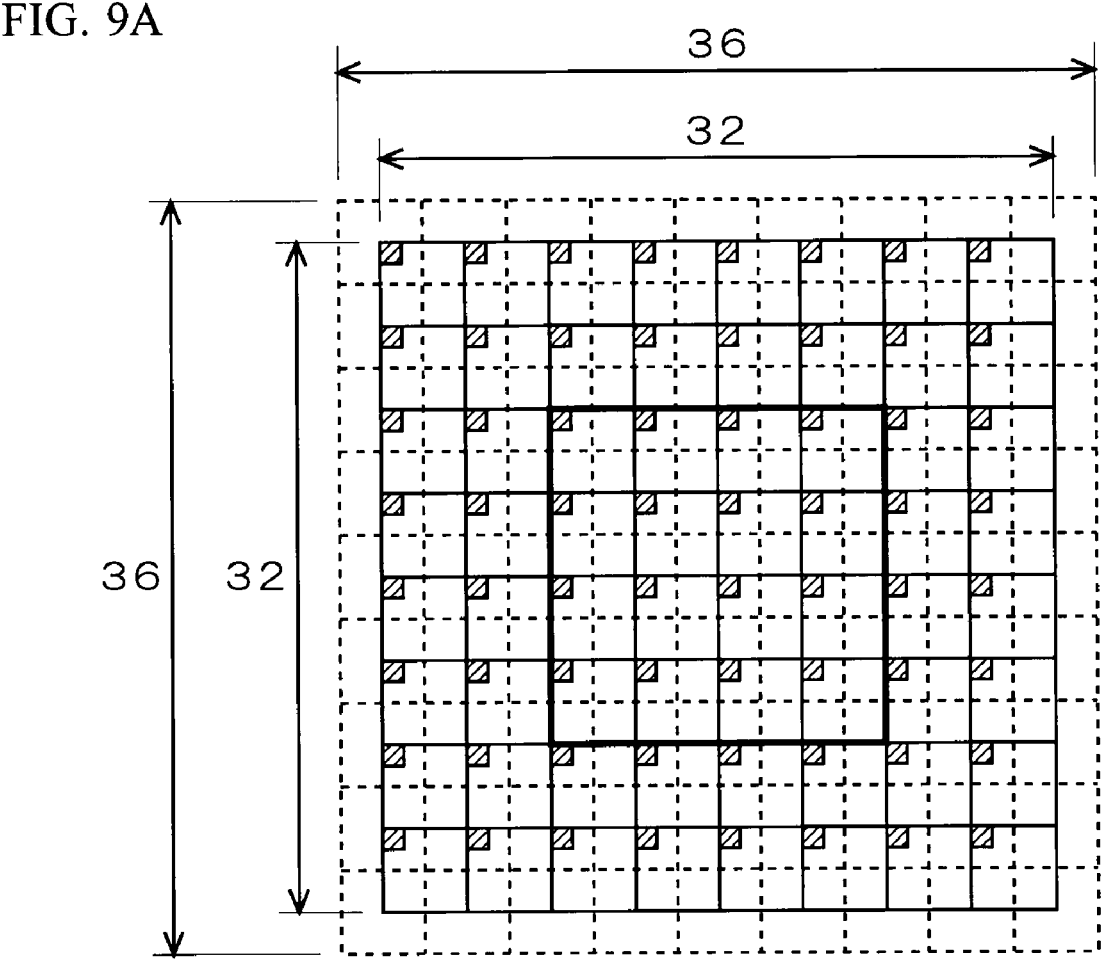
FIG. 9B
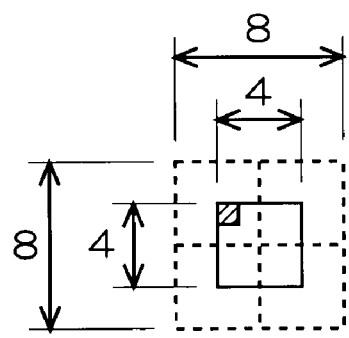
FIG. 9C

IMAGE PROCESSOR

CROSS-REFERENCE TO RELATED APPLICATIONS

This application claims priority to Japanese Patent Application No. 2008-061990. The entire disclosure of Japanese Patent Application No. 2008-061990 is hereby incorporated herein by reference.

BACKGROUND OF THE INVENTION

1. Field of the Invention

The present invention generally relates to an image processor, and more particularly, to an encoder and a decoder for HD Photo.

2. Description of the Background Art

Microsoft Corporation proposes HD Photo (or JPEG XR) as a still image file format that offers higher image quality than JPEG while requiring more simple circuit configuration and computation than JPEG 2000.

An encoder for HD Photo includes a frequency transform unit performing predetermined frequency transform (PCT), and a pre-filter performing predetermined prefiltering so as to reduce block artifacts. The frequency transform unit performs frequency transform with a pixel block having 4 pixels in column×4 pixels in row as a unit region for processing. The pre-filter performs prefiltering with a region which overlaps with plural unit regions for processing by the frequency transform unit as a unit region for processing, before frequency transform is performed. The frequency transform unit performs frequency transform on a first pixel block that includes plural unit regions for processing as a target block, and the pre-filter performs prefiltering on a second pixel block that is 2 pixels each larger horizontally and vertically than the first pixel block as a target block. The size of the first pixel block is 16 pixels in column×16 pixels in row in the first stage, and is 4 pixels in column×4 pixels in row in the second stage. The size of the second pixel block is 20 pixels in column×20 pixels in row in the first stage, and is 8 pixels in column×8 pixels in row in the second stage.

In this Specification, to facilitate the description, only an example of processing an image in YUV444 format is described. As to chrominance signals when processing an image in YUV422 format, the size of the first pixel block is 16 pixels in column×8 pixels in row in the first stage, and is 4 pixels in column×2 pixels in row in the second stage. The size of the second pixel block is 20 pixels in column×12 pixels in row in the first stage, and is 8 pixels in column×6 pixels in row in the second stage. Similarly, as to chrominance signals when processing an image in YUV420 format, the size of the first pixel block is 8 pixels in column×8 pixels in row in the first stage, and is 2 pixels in column×2 pixels in row in the second stage. The size of the second pixel block is 12 pixels in column×12 pixels in row in the first stage, and is 6 pixels in column×6 pixels in row in the second stage.

A decoder for HD Photo includes a frequency inverse transform unit performing frequency inverse transform that corresponds to the above frequency transform, and a post-filter performing postfiltering that corresponds to the above prefiltering. The frequency inverse transform unit performs frequency inverse transform with a pixel block having 4 pixels in column×4 pixels in row as a unit region for processing. The post-filter performs postfiltering with a region which overlaps with plural unit regions for processing by the frequency inverse transform unit as a unit region for processing, after frequency inverse transform is performed. The frequency inverse transform unit performs frequency inverse transform on a first pixel block that includes plural unit regions for processing as a target block, and the post-filter performs postfiltering on a second pixel block that is shifted from the first pixel block by 2 pixels each horizontally and vertically as a target block. The sizes of the first and second pixel blocks are 16 pixels in column×16 pixels in row in the first stage, and are 4 pixels in column×4 pixels in row in the second stage.

The details of HD Photo are disclosed in, for example, "HD Photo—Photographic Still Image File Format", [online], 7 Nov. 2006, Microsoft Corporation, [searched in the Internet on 10 Oct. 2007], <URL: http://www.microsoft.com/whdc/xps/hdphotodpk.mspx>. The details of JPEG XR are disclosed in, for example, "Coding of Still Pictures—JBIG JPEG", [online], 19 Dec. 2007, ISO/IEC JTC 1/SC 29/WG1 N 4392, [searched in the Internet on 4 Mar. 2008], <URL: http://www.itscj.ipsj.or.jp/sc29/open/29view/29n9026t.doc>

FIG. 17 illustrates prefiltering in HD Photo. A pixel block PB101 is a target pixel block of frequency transform having 16 pixels in column×16 pixels in row. A pixel block PB102 is a target pixel block of prefiltering having 20 pixels in column×20 pixels in row. The pixel block PB102 is 2 pixels each larger to the left, right, top and bottom than the pixel block PB101.

Prefiltering of a region R101 indicated by a sanded pattern has already been performed in processing each of the pixel blocks above to the left of and just above the pixel block PB101, and the pixel signals after prefiltering have been transmitted to the frequency transform unit. Prefiltering of a region R102 indicated by vertical stripes has already been performed in processing the pixel block above to the left of the pixel block PB101, and the pixel signals after prefiltering have been stored in a first memory (not shown). The first memory is a line memory with capacity in accordance with the length of a row in a pixel plane. Prefiltering of a region R103 indicated by zigzag lines has already been performed in processing the pixel block just above the pixel block PB101, and the pixel signals after prefiltering have been stored in the first memory. Prefiltering of a region R104 indicated by a sanded pattern has already been performed in processing the pixel block on the left of the pixel block PB101, and the pixel signals after prefiltering have been transmitted to the frequency transform unit. Prefiltering of a region R105 indicated by a netted pattern has already been performed in processing the pixel block on the left of the pixel block PB101, and the pixel signals after prefiltering have been stored in a second memory (not shown). Unlike the above line memory, capacity of the second memory is independent of the length of a row in a pixel plane. Prefiltering of a region R106 indicated by a lattice pattern has already been performed in processing the pixel block on the left of the pixel block PB101, and the pixel signals after prefiltering have been stored in the first memory.

In this state, the pixel signals of a pixel block PB103 having 16 pixels in column×16 pixels in row indicated by thick, broken lines are inputted to the pre-filter. The pre-filter performs prefiltering on these pixel signals inputted thereto. The pixel signals after prefiltering of the pixel block PB101 are transmitted to the frequency transform unit. The pixel signals after prefiltering of a region R107 indicated by lateral stripes are stored in the second memory. The pixel signals after prefiltering of a region R108 indicated by oblique lines are stored in the first memory.

Since the pixel signals after prefiltering of the region R108 are to be used in processing each of the pixel blocks just under and below to the right of the pixel block PB101, the pixel signals after prefiltering of the region R108 need to remain stored in the first memory until processing of these pixel blocks is completed. The same is true of other pixel blocks in the same tier as the pixel block PB101. Consequently, capacity of the first memory increases in proportion to the length of a row in a pixel plane. Thus processing a large size image requires increased capacity of the first memory, resulting in increase in overall circuit size of the image processor.

FIG. 18 illustrates postfiltering in HD Photo. A pixel block PB201 is a target pixel block of frequency inverse transform having 16 pixels in column×16 pixels in row. A pixel block PB202 is a target pixel block of postfiltering having 16 pixels in column×16 pixels in row. The pixel block PB202 is shifted from the pixel block PB201 by 2 pixels each to the left and top. Postfiltering of the region in the pixel block PB201 which does not overlap with the pixel block PB202 is performed in processing each of the pixel blocks on the right of, just under, and below to the right of the pixel block PB201.

The pixel signals of a region R201 indicated by zigzag lines have already been transmitted from the frequency inverse transform unit to the post-filter in processing each of the pixel blocks above to the left of and just above the pixel block PB201, and the pixel signals before postfiltering have been stored in a third memory (not shown). The third memory is a line memory with capacity in accordance with the length of a row in a pixel plane. The pixel signals of a region R202 indicated by a netted pattern have already been transmitted from the frequency inverse transform unit to the post-filter in processing the pixel block on the left of the pixel block PB201, and the pixel signals before postfiltering have been stored in a fourth memory (not shown). Unlike the above line memory, capacity of the fourth memory is independent of the length of a row in a pixel plane. The pixel signals of a region R203 indicated by a sanded pattern have already been transmitted from the frequency inverse transform unit to the post-filter in processing the pixel block on the left of the pixel block PB201, and the pixel signals before postfiltering have been stored in the third memory.

In this state, the pixel signals of the pixel block PB201 are inputted from the frequency inverse transform unit to the post-filter. The post-filter performs postfiltering on the pixel signals of the pixel block PB202. The pixel signals before postfiltering of a region R204 indicated by lateral stripes are stored in the fourth memory. The pixel signals before postfiltering of a region R205 indicated by oblique lines are stored in the third memory.

Since the pixel signals before postfiltering of the region R205 are to be used in processing each of the pixel blocks just under and below to the right of the pixel block PB201, the pixel signals before postfiltering of the region R205 need to remain stored in the third memory until processing of these pixel blocks is completed. The same is true of other pixel blocks in the same tier as the pixel block PB201. Consequently, capacity of the third memory increases in proportion to the length of a row in a pixel plane. Thus processing a large size image requires increased capacity of the third memory, resulting in increase in overall circuit size of the image processor.

SUMMARY OF THE INVENTION

It is an object of the present invention to provide an image processor with reduced overall circuit size, by reducing capacity required for a memory.

According to a first aspect of the present invention, an image processor includes a frequency transform unit performing frequency transform on a first pixel block as a target block, and a pre-filter performing prefiltering with a region which overlaps with plural unit regions for processing by the frequency transform unit as a unit region for processing, before frequency transform is performed. The pre-filter performs prefiltering on a second pixel block which is a predetermined number of pixels each larger horizontally and vertically than the first pixel block as a target block. The second pixel block is a plurality of second pixel blocks. The pre-filter performs prefiltering sequentially on the plurality of second pixel blocks aligned horizontally. The number of pixel signals in a vertical direction within a group of pixel signals continuously inputted to the pre-filter for prefiltering is equal to the number of rows in the second pixel block.

Preferably in the image processor, the pre-filter includes a memory unit, and among a group of pixel signals after prefiltering obtained by prefiltering one of the plurality of second pixel blocks, pixel signals of a column overlapping with the first pixel block corresponding to a subsequent second pixel block are stored in the memory unit.

According to a second aspect of the present invention, an image processor includes a frequency inverse transform unit performing frequency inverse transform on a first pixel block as a target block, a post-filter performing postfiltering with a region which overlaps with plural unit regions for processing by the frequency inverse transform unit as a unit region for processing, after frequency inverse transform is performed, and a first memory unit externally connected to the post-filter. The post-filter performs postfiltering on a second pixel block which is shifted from the first pixel block by a predetermined number of pixels each horizontally and vertically as a target block. The second pixel block is a plurality of second pixel blocks. The post-filter performs postfiltering sequentially on the plurality of second pixel blocks aligned in a vertical direction. Among a group of pixel signals of the first pixel block inputted from the frequency inverse transform unit to the post-filter, pixel signals of a row not overlapping with the second pixel block are stored in the first memory unit.

Preferably in the image processor, the post-filter includes a second memory unit, and among a group of pixel signals of the first pixel block inputted from the frequency inverse transform unit to the post-filter, pixel signals of a column not overlapping with the second pixel block are stored in the second memory unit.

The overall circuit size of an image processor is reduced.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 9A to 9C illustrate frequency transform by a frequency transform unit.

DESCRIPTION OF THE PREFERRED EMBODIMENTS

Figure 1:
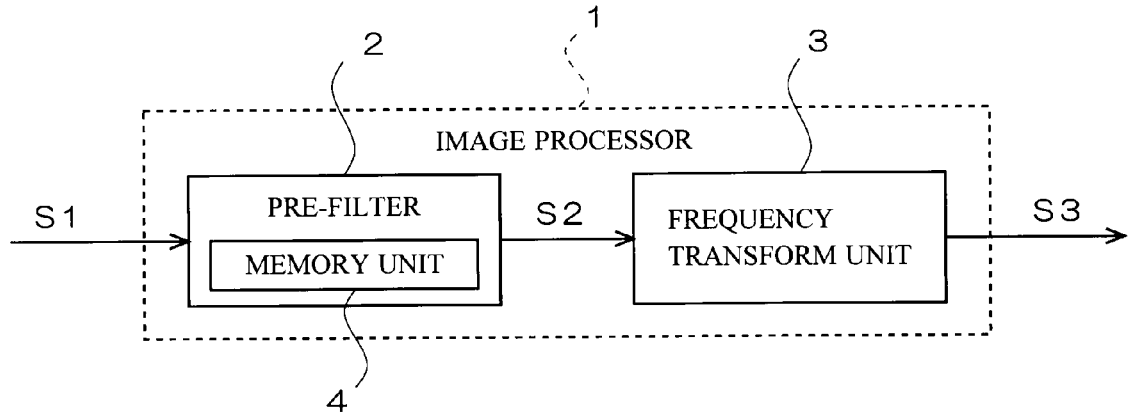
FIG. 1 is a block diagram showing a configuration of an image processor according to a first preferred embodiment of the present invention.

Preferred embodiments of the present invention are described in detail below referring to the drawings. It should be noted that identical reference numerals throughout the drawings indicate identical or equivalent elements.

An example of applying an image processor according to the present invention to an encoder (specifically a pre-filter) for HD Photo is described in the following first preferred embodiment. Furthermore, an example of applying an image processor according to the present invention to a decoder (specifically a post-filter) for HD Photo is described in the following second preferred embodiment.

First Preferred Embodiment

FIG. 1 is a block diagram showing a configuration of an image processor 1 according to a first preferred embodiment of the present invention. The image processor 1 includes a pre-filter 2 and a frequency transform unit 3. The pre-filter 2 includes a memory unit 4 as an internal memory. Unlike a line memory with capacity in accordance with the length of a row in a pixel plane, capacity of the memory unit 4 is independent of the length of a row in a pixel plane.

A pixel signal S1 (such as color signal, luminance signal, or chrominance signal) is inputted from a preceding processing unit in the image processor 1 (for example, a color conversion unit) to the pre-filter 2. The pre-filter 2 performs prefiltering on the pixel signal S1 and outputs a pixel signal S2 after prefiltering. The pixel signal S2 is inputted to the frequency transform unit 3. The frequency transform unit 3 performs frequency transform on the pixel signal S2 and outputs a signal S3 after frequency transform.

Figure 2:
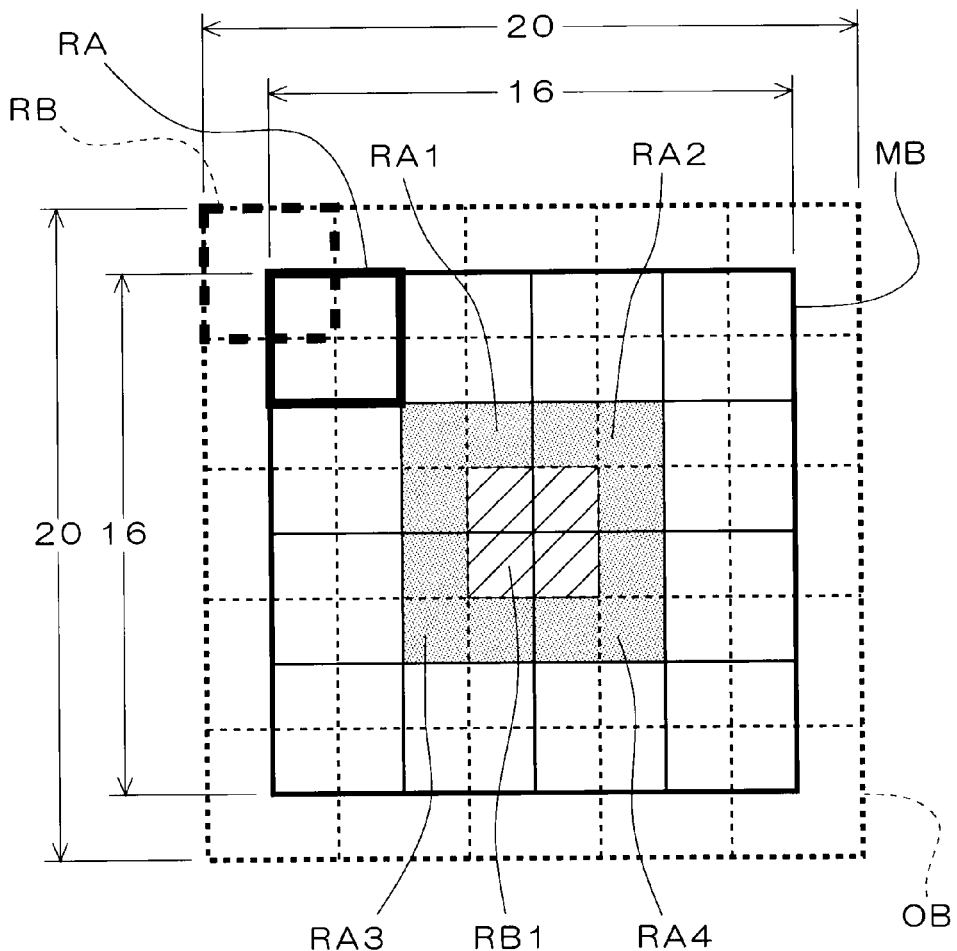
FIG. 2 is a diagram showing a macroblock within a pixel plane.

FIG. 2 is a diagram showing a macroblock MB within a pixel plane. The macroblock MB consists of a total of 256 pixels of 16 pixels in column×16 pixels in row. A total of 16 pixel blocks RA of 4 in column×4 in row are defined within the macroblock MB. Each pixel block RA consists of a total of 16 pixels of 4 pixels in column×4 pixels in row. The frequency transform unit 3 performs predetermined frequency transform (PCT: HD Photo Core Transform) with each pixel block RA as a unit region for processing.

Furthermore, a pixel block OB having 20 pixels in column×20 pixels in row, which is 2 pixels each larger to the left, right, top and bottom than the macroblock MB, is defined. A total of 25 pixel blocks RB of 5 in column×5 in row are defined within the pixel block OB. Each pixel block RB consists of a total of 16 pixels of 4 pixels in column×4 pixels in row. The pre-filter 2 performs predetermined prefiltering with each pixel block RB as a unit region for processing. However, at an edge of a pixel plane, a unit region for processing having 4 pixels in column×4 pixels in row is not secured, but a pixel block having 4 pixels in column×2 pixels in row, 2 pixels in column×4 pixels in row, or 2 pixels in column×2 pixels in row serves as a unit region for processing of the pre-filter 2.

As shown in FIG. 2, a pixel block RB1 (indicated by oblique lines), which is a unit region for processing of the pre-filter 2, overlaps with 4 pixel blocks RA1 to RA4 (indicated by a sanded pattern), which are unit regions for processing of the frequency transform unit 3. Thus the pre-filter 2 performs prefiltering with a region which overlaps with plural unit regions for processing by the frequency transform unit 3 as a unit region for processing. Consequently, block artifacts are reduced.

FIGS. 3 to 7 are diagrams illustrating how the image processor 1 operates. In each figure, to simplify the description, 9 pixel blocks corresponding to 9 macroblocks MB positioned at the center of a pixel plane are extracted and shown as pixel blocks R11 to R13, R21 to R23, and R31 to R33. Among them, the pixel block R22 at the center is the currently target pixel block.

Furthermore, to clearly illustrate, in FIGS. 3 to 7, the regions whose pixel signals have been inputted from a preceding processing unit in the image processor 1 to the pre-filter 2 are indicated by zigzag lines. Similarly, the regions where prefiltering by the pre-filter 2 has been completed are indicated by a sanded pattern. Similarly, the regions whose pixel signals have been stored in the memory unit 4 are indicated by a netted pattern. Similarly, the regions whose pixel signals have been transmitted from the pre-filter 2 to the frequency transform unit 3 are indicated by oblique lines. Similarly, the regions whose pixel signals are discarded are indicated by vertical stripes.

Figure 3:
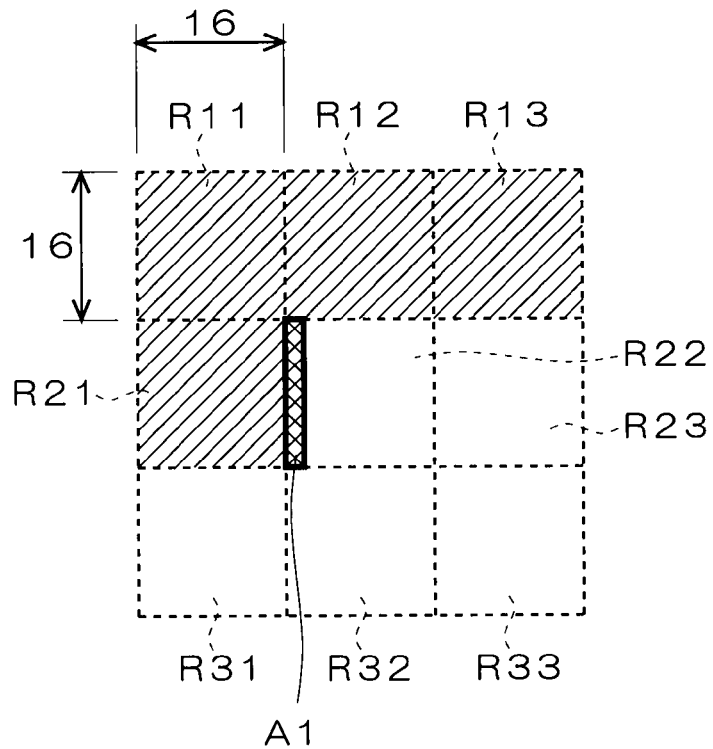
FIG. 3 is a diagram illustrating how the image processor operates.

Referring first to FIG. 3, prefiltering by the pre-filter 2 of the pixel blocks R11 to R13 and R21 and transmission of the pixel signals thereof from the pre-filter 2 to the frequency transform unit 3 have been completed at this time. Furthermore, after prefiltering by the pre-filter 2 of a region A1, which is the left 2 columns in the pixel block R22, in processing the pixel block R21, the pixel signals after prefiltering of this region have been stored in the memory unit 4.

Figure 4:
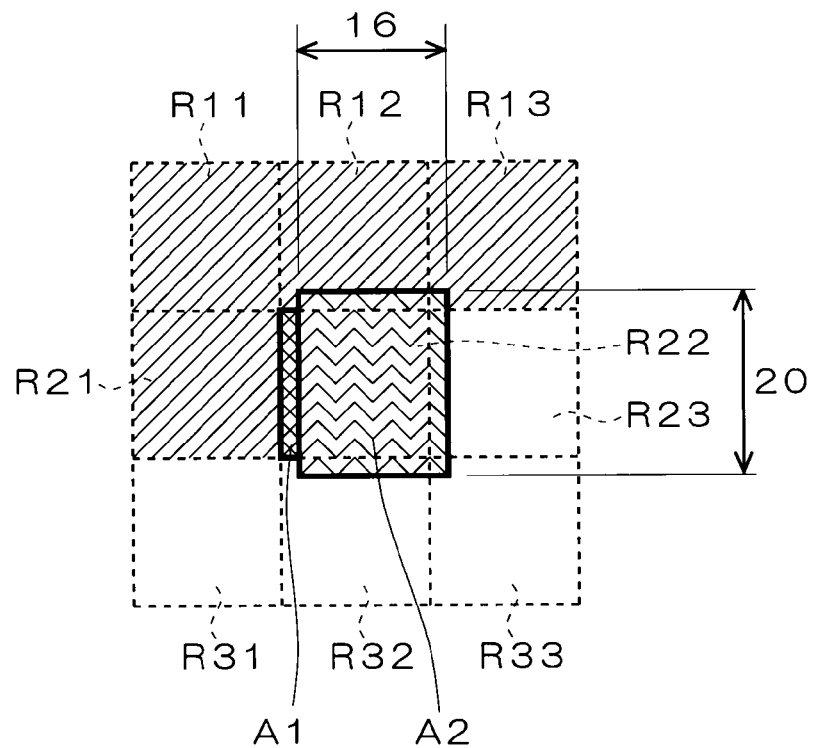
FIG. 4 is a diagram illustrating how the image processor operates.

Referring next to FIG. 4, 20 in column×16 in row pixel signals (region A2) that are equivalent to a pixel block having 20 pixels in column×16 pixels in row are continuously inputted from a preceding processing unit in the image processor 1 to the pre-filter 2. The region A2 is 2 pixels each larger to the top and bottom than the pixel block R22. Furthermore, as shown in FIG. 2, a target block of prefiltering (pixel block OB) defined over the pixel block R22 is 2 pixels each larger to the top and bottom than the pixel block R22. Thus the number of pixel signals in a vertical direction (20 pixels in this example) within a group of pixel signals continuously inputted to the pre-filter 2 for prefiltering is equal to the number of rows of a target pixel block of the pre-filter 2 (20 rows in this example).

Figure 5:
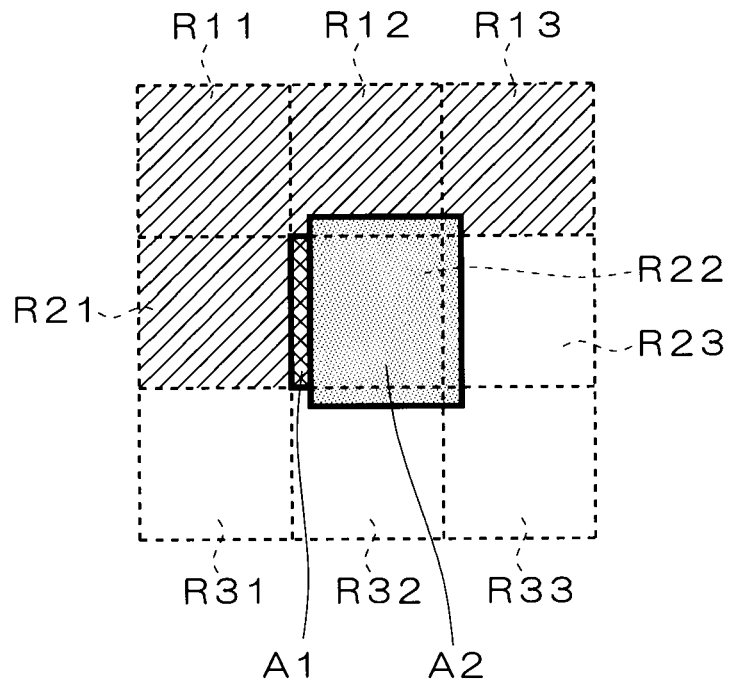
FIG. 5 is a diagram illustrating how the image processor operates.

Referring next to FIG. 5, the pre-filter 2 performs prefiltering on the 20 in column×16 in row pixel signals of the region A2, using a 4 rows×4 columns prefiltering element for twenty times.

Figure 6:
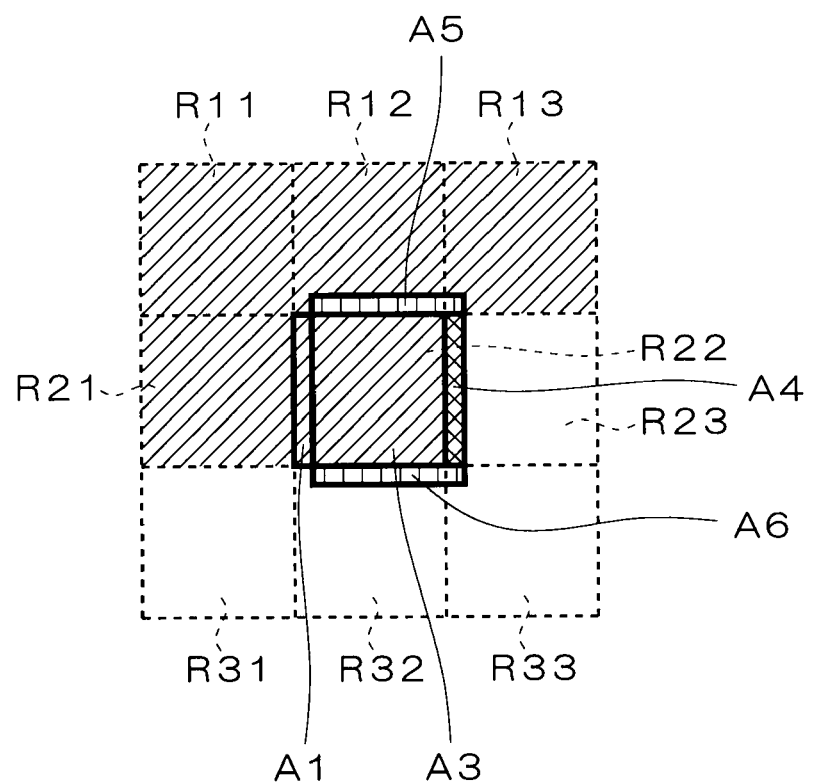
FIG. 6 is a diagram illustrating how the image processor operates.

Referring next to FIG. 6, the pixel signals after prefiltering of the region A1 read from the memory unit 4 and the pixel signals after prefiltering of a region A3, which is the part overlapping with the pixel block R22 in the region A2, are transmitted from the pre-filter 2 to the frequency transform unit 3. Meanwhile, the pixel signals after prefiltering of a region A4, which is the part overlapping with the pixel block R23 in the region A2, are stored in the memory unit 4. Furthermore, the pixel signals after prefiltering of a region A5, which is the top 2 rows in the region A2, and the pixel signals after prefiltering of a region A6, which is the bottom 2 rows in the region A2, are discarded.

Figure 7:
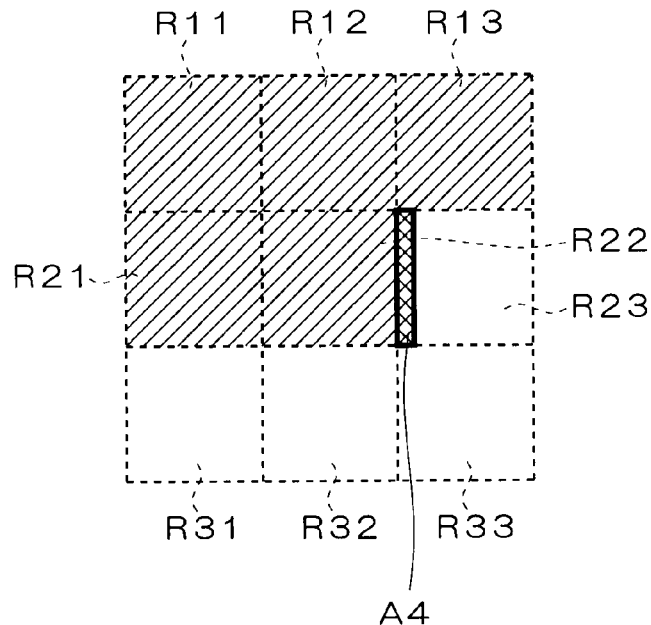
FIG. 7 is a diagram illustrating how the image processor operates.

Consequently, as shown in FIG. 7, processing of only one pixel block R22 has progressed from the state shown in FIG. 3. From then on, the same processing is repeated.

<Summary>

In the image processor 1 according to the first preferred embodiment, a target block of the pre-filter 2 is a second pixel block (pixel block OB in FIG. 2) that is a predetermined number of pixels each larger horizontally and vertically than a first pixel block (macroblock MB in FIG. 2). As shown in FIGS. 3 to 7, the pre-filter 2 performs prefiltering sequentially on a plurality of second pixel blocks corresponding to a plurality of pixel blocks R21 to R23 aligned horizontally. The number of pixel signals in a vertical direction (20 in the above example) within a group of pixel signals (region A2 in FIG. 4) continuously inputted to the pre-filter 2 for prefiltering is equal to the number of rows of the second pixel block (20 rows in the above example). Consequently, the image processor 1 according to the first preferred embodiment does not require a line memory with capacity in accordance with length of a row in a pixel plane. Thus overall circuit size of the image processor 1 is reduced.

Furthermore, the pre-filter 2 of the image processor 1 according to the first preferred embodiment includes the memory unit 4. Among a group of pixel signals after prefiltering (region A2 in FIG. 5) obtained by prefiltering one of the second pixel blocks, the pixel signals (region A4 in FIG. 6) of a column overlapping with the first pixel block (pixel block R23) corresponding to a subsequent second pixel block are stored in the memory unit 4. Thus the image processor 1 according to the first preferred embodiment requires only 320 pixel signals (region A2 in FIG. 4, 20 pixels in column×16 pixels in row) for each second pixel block to be inputted to the pre-filter 2. Thus the amount of pixel signals transmitted from a preceding processing unit to the pre-filter 2 is reduced by 20%, compared to a case where 400 pixel signals (20 pixels in column×20 pixels in row) are transmitted for each second pixel block without the memory unit 4. The memory unit 4 has only a slight influence on increase in the circuit size of the image processor 1, since the capacity thereof is independent of the length of a pixel plane.

Meanwhile, it is also possible to omit the memory unit 4 by transmitting 400 pixel signals (20 pixels in column×20 pixels in row) for each second pixel block. In such a case, the circuit size of the image processor 1 is further reduced.

<Modification>

Figure 8:
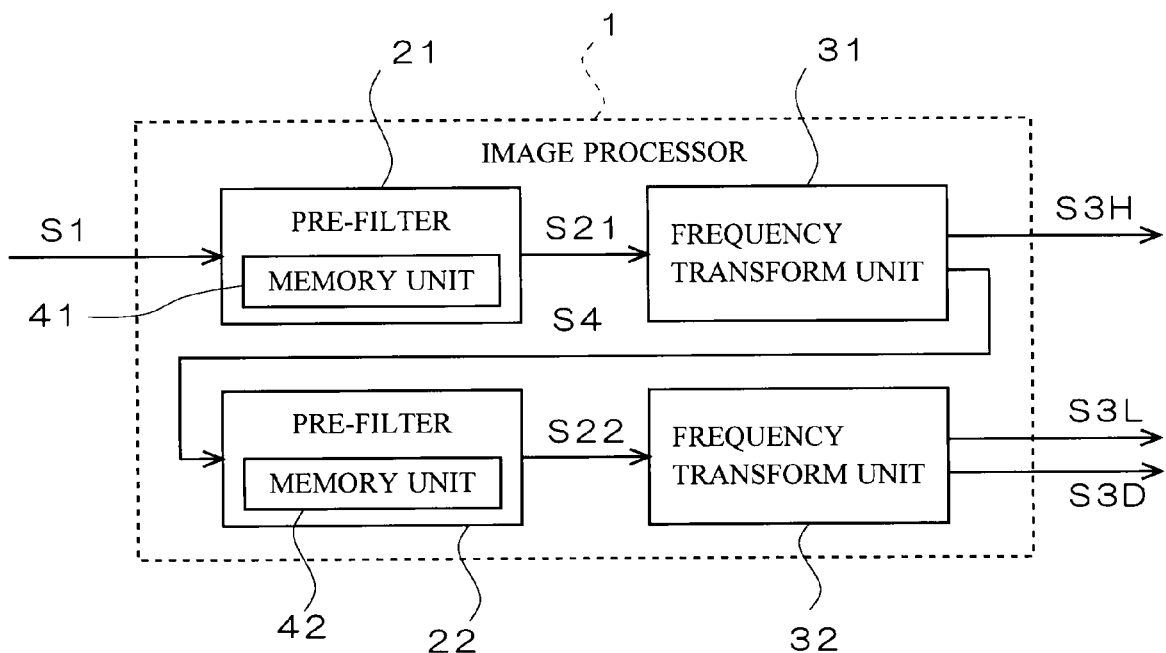
FIG. 8 is a block diagram showing a configuration of an image processor according to a modification of the first preferred embodiment.

FIG. 8 is a block diagram showing a configuration of an image processor 1 according to a modification of the first preferred embodiment. The image processor 1 includes a pre-filter 21 and a frequency transform unit 31 of a first stage, and a pre-filter 22 and a frequency transform unit 32 of a second stage. The pre-filter 21 includes a memory unit 41, and the pre-filter 22 includes a memory unit 42. The memory units 41 and 42 are equivalent to the memory unit 4 shown in FIG. 1.

A pixel signal S1 is inputted from a preceding processing unit in the image processor 1 to the pre-filter 21. The pre-filter 21 performs prefiltering on the pixel signal S1 and outputs a pixel signal S21 after prefiltering. The pixel signal S21 is inputted to the frequency transform unit 31. The frequency transform unit 31 performs frequency transform on the pixel signal S21, and outputs a signal S3H of highpass component and a signal S4 of direct current component in the first stage. The signal S4 is inputted to the pre-filter 22. The pre-filter 22 performs prefiltering on the signal S4 and outputs a signal S22 after prefiltering. The signal S22 is inputted to the frequency transform unit 32. The frequency transform unit 32 performs frequency transform on the signal S22, and outputs a signal S3L of lowpass component and a signal S3D of direct current component.

Similar to the pre-filter 2 shown in FIG. 1, a line memory with capacity in accordance with the length of a row in a pixel plane is omitted from the pre-filters 21 and 22.

FIGS. 9A-9C illustrate frequency transform by the frequency transform units 31 and 32. As shown in FIG. 9C, 1 signal S3D of direct current component is outputted from the frequency transform unit 32. As shown in FIG. 9B, among the signals of a pixel plane having 4 pixels in column×4 pixels in row, 15 signals S3L of lowpass component other than the one of direct current component in the top left corner are outputted from the frequency transform unit 32. In such a case, it is required that the pre-filter 22 performs prefiltering on a pixel plane having 8 pixels in column×8 pixels in row, which is 2 pixels each larger to the left, right, top and bottom than the pixel plane having 4 pixels in column×4 pixels in row.

In order to form this pixel plane having 8 pixels in column×8 pixels in row, it is required to align the pixel signals of direct current component in the first stage. Thus as shown in FIG. 9A, it is required that frequency transform is performed on 8 in column×8 in row unit regions for processing (32 pixels in column×32 pixels in row). In such a case, it is required that the pre-filter 21 performs prefiltering on a pixel plane having 36 pixels in column×36 pixels in row, which is 2 pixels each larger to the left, right, top and bottom than the pixel plane having 32 pixels in column×32 pixels in row. The frequency transform unit 31 performs frequency transform on a region having 16 pixels in column×16 pixels in row boxed with the thick lines (consisting of 16 unit regions for processing each having 4 pixels in column×4 pixels in row) as a currently target macroblock. As a result, 240 signals S3H (15 pixels×16) of highpass component other than those of direct current component in the top left corner of each of the unit regions for processing are outputted from the frequency transform unit 31.

In this way, prefiltering in both first and second stages requires pixel signals equivalent to a pixel space having 36 pixels in column×36 pixels in row to be inputted to the pre-filter 21 in the first stage for each macroblock. However, the pre-filter 21 includes the memory unit 41. Thus the pixel signals after prefiltering of the region on the right half of FIG. 9A are stored in the memory unit 41, so that prefiltering of this region can be omitted in processing a subsequent macroblock.

Second Preferred Embodiment

Figure 10:
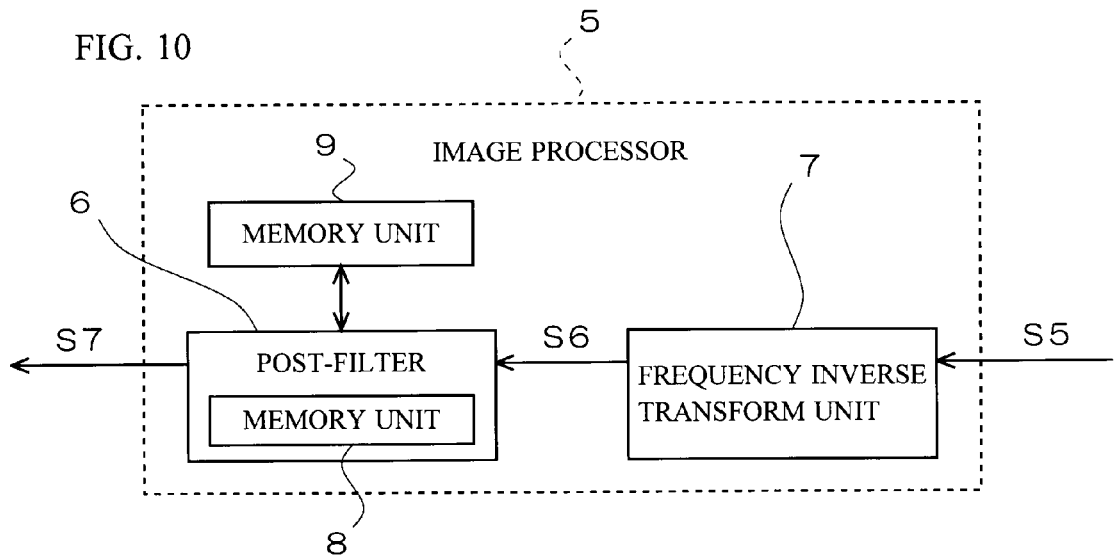
FIG. 10 is a block diagram showing a configuration of an image processor according to a second preferred embodiment of the present invention.

FIG. 10 is a block diagram showing a configuration of an image processor 5 according to a second preferred embodiment of the present invention. The image processor 5 includes a post-filter 6, a frequency inverse transform unit 7, and a memory unit 9. The post-filter 6 includes a memory unit 8 as an internal memory. Unlike a line memory with capacity in accordance with the length of a row in a pixel plane, capacity of the memory unit 8 is independent of the length of a row in a pixel plane. The memory unit 9 is connected to the post-filter 6 as an external memory of the post-filter 6. The memory unit 9 may be arranged external to the image processor 5 and connected to the post-filter 6 via an external bus.

A signal S5 after dequantization is inputted from a preceding processing unit in the image processor 5 (for example, a dequantization unit) to the frequency inverse transform unit 7. The frequency inverse transform unit 7 performs frequency inverse transform on the signal S5 and outputs a pixel signal S6 after frequency inverse transform. The pixel signal S6 is inputted to the post-filter 6. The post-filter 6 performs post-filtering on the pixel signal S6 and outputs a pixel signal S7 after postfiltering.

Figure 11:
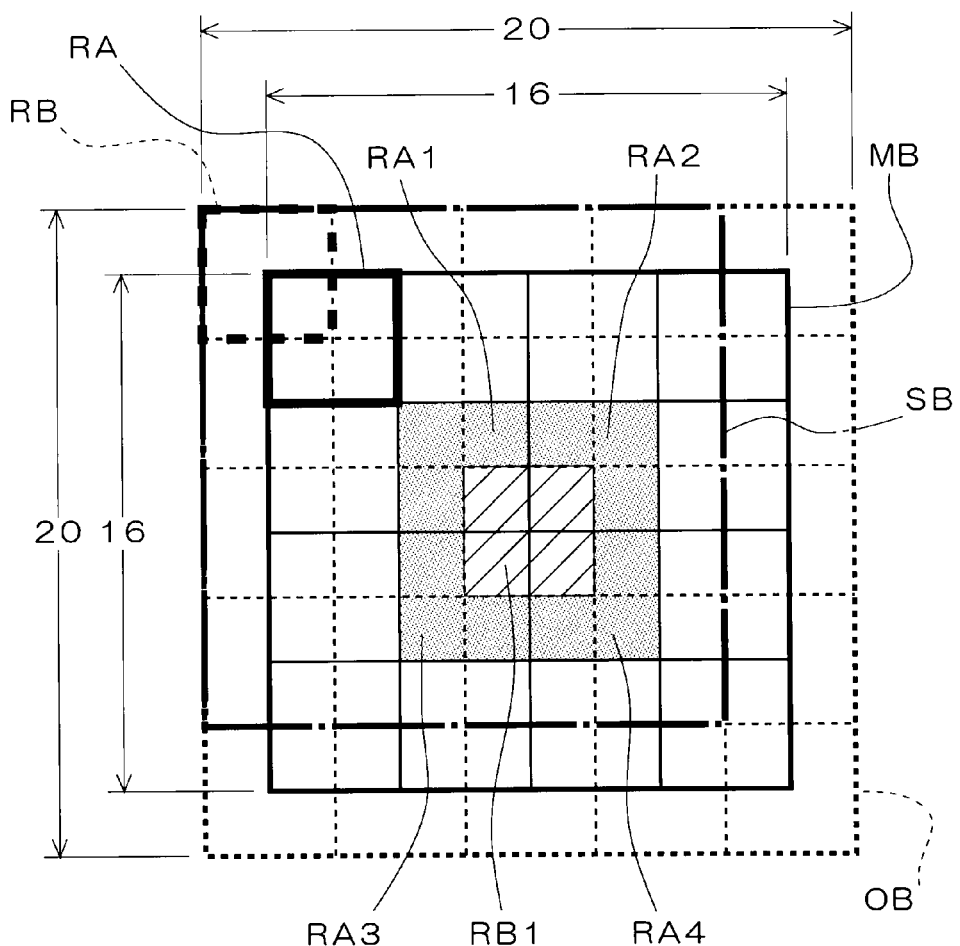
FIG. 11 is a diagram showing a macroblock within a pixel plane.

FIG. 11 is a diagram showing a macroblock MB within a pixel plane. Referring to FIG. 11, the frequency inverse transform unit 7 performs predetermined frequency inverse transform, corresponding to the above frequency transform (PCT), with each pixel block RA as a unit region for processing. Furthermore, the post-filter 6 performs predetermined postfiltering, corresponding to the above prefiltering, with each pixel block RB as a unit region for processing. However, at an edge of a pixel plane, a unit region for processing having 4 pixels in column×4 pixels in row is not secured, but a pixel block having 4 pixels in column×2 pixels in row, 2 pixels in column×4 pixels in row, or 2 pixels in column×2 pixels in row serves as a unit region for processing of the post-filter 6. As shown in FIG. 11, a pixel block RB1, which is a unit region for processing of the post-filter 6, overlaps with 4 pixel blocks RA1 to RA4, which are unit regions for processing of the frequency inverse transform unit 7.

In FIG. 11, a macroblock MB is a target pixel block of the frequency inverse transform having 16 pixels in column×16 pixels in row. A pixel block SB indicated by thick, dashed-dotted lines is a target pixel block for one postfiltering having 16 pixels in column×16 pixels in row. The pixel block SB is shifted from the macroblock MB by 2 pixels each to the left and top. Postfiltering of the region in the macroblock MB which does not overlap with the pixel block SB is performed in processing each of the macroblocks on the right of, just under, and below to the right of the macroblock MB.

FIGS. 12 to 15 are diagrams illustrating how the image processor 5 operates. In each figure, to simplify the description, 9 pixel blocks corresponding to 9 macroblocks MB positioned at the center of a pixel plane are extracted and shown as pixel blocks R51 to R53, R61 to R63, and R71 to R73. Among them, the pixel block R62 at the center is the currently target pixel block.

Furthermore, to clearly illustrate, in FIGS. 12 to 15, the regions whose pixel signals have been transmitted from the frequency inverse transform unit 7 to the post-filter 6 are indicated by zigzag lines. Similarly, the regions where post-filtering by the post-filter 6 has been completed are indicated by a sanded pattern. Similarly, the regions whose pixel signals have been stored in the memory unit 8 are indicated by a netted pattern. Similarly, the regions whose pixel signals have been stored in the memory unit 9 are indicated by vertical stripes. Similarly, the regions whose pixel signals have been transmitted from the post-filter 6 to a subsequent processing unit are indicated by oblique lines.

Figure 12:
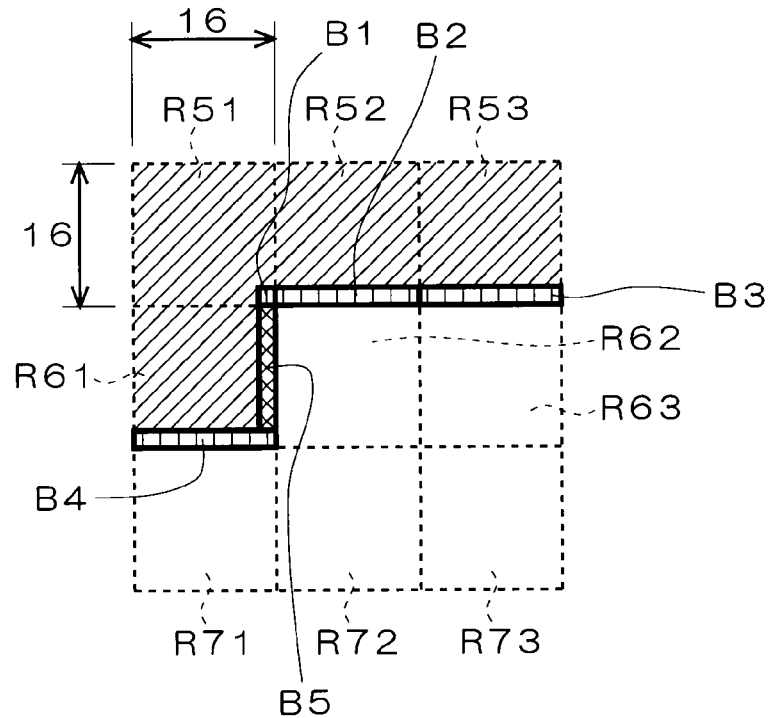
FIG. 12 is a diagram illustrating how the image processor operates.

Referring first to FIG. 12, transmission of the pixel signals of the pixel blocks R51 to R53 and R61 from the frequency inverse transform unit 7 to the post-filter 6 has been completed at this time. The pixel signals before postfiltering of a region B1, which is the bottom right 2 rows×2 columns in the pixel block R51, a region B2, which is the bottom 2 rows in the pixel block R52, a region B3, which is the bottom 2 rows in the pixel block R53, and a region B4, which is the bottom 2 rows in the pixel block R61 have been stored in the memory unit 9. Furthermore, the pixel signals before post-filtering of a region B5, which is the top right 14 rows×2 columns (or the right 2 columns) in the pixel block R61, have been stored in the memory unit 8.

Figure 13:
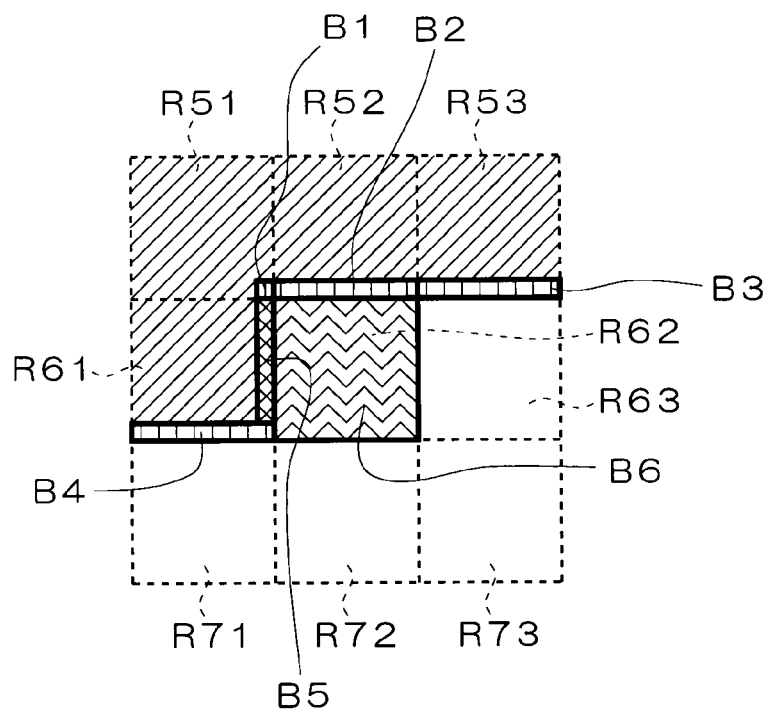
FIG. 13 is a diagram illustrating how the image processor operates.

Referring next to FIG. 13, 16 in column×16 in row pixel signals (region B6) that are equivalent to the pixel block R62 having 16 pixels in column×16 pixels in row are continuously inputted from the frequency inverse transform unit 7 to the post-filter 6.

Figure 14:
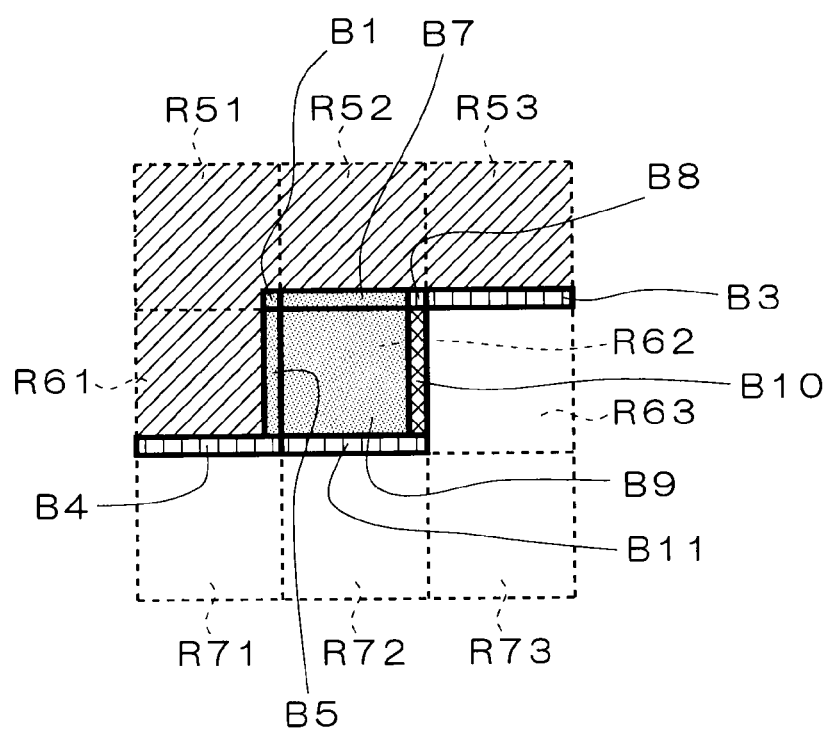
FIG. 14 is a diagram illustrating how the image processor operates.

Referring next to FIG. 14, post-filtering is performed on the pixel signals of the region B1 read from the memory unit 9, the pixel signals of a region B7, which is the left 14 columns in the region B2 read from the memory unit 9, the pixel signals of the region B5 read from the memory unit 8, and the pixel signals of a region B9, which is the top left 14 columns× 14 rows in the region B6. Specifically, the post-filter 6 performs postfiltering on these 16 in column×16 in row pixel signals, using a 4 rows×4 columns postfiltering element for sixteen times. The pixel signals of a region B10, which is the top right 14 rows×2 columns (or the right 2 columns) in the region B6, are stored in the memory unit 8 without postfiltering by the post-filter 6 being performed at this time. Furthermore, the pixel signals of a region B11, which is the bottom 2 rows in the region B6, are stored in the memory unit 9 without postfiltering by the post-filter 6 being performed at this time.

Figure 15:
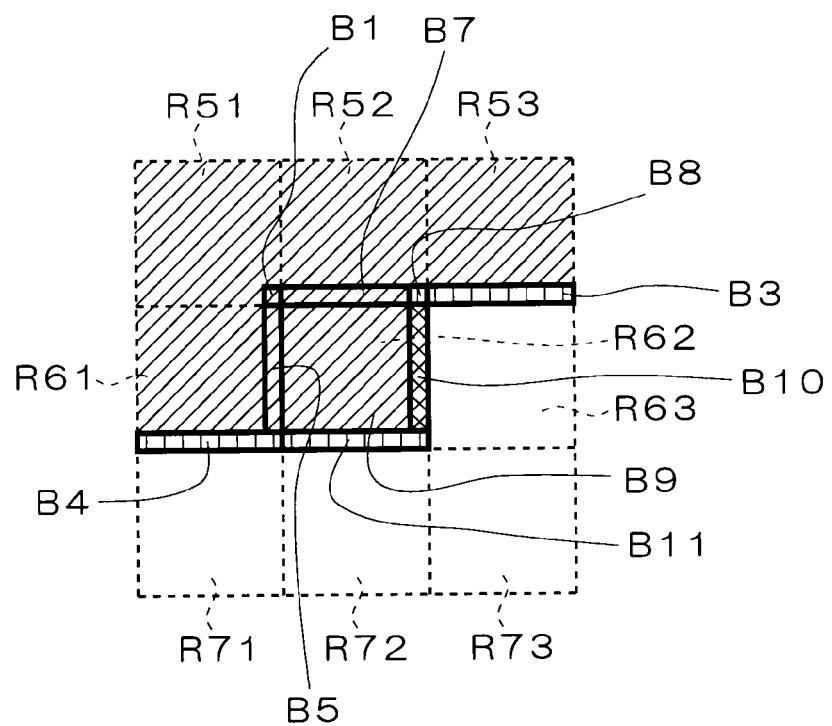
FIG. 15 is a diagram illustrating how the image processor operates.

Referring next to FIG. 15, the pixel signals after postfiltering of the regions B1, B7, B5 and B9 are outputted from the post-filter 6 to a subsequent processing unit. Consequently, as shown in FIG. 15, processing of only one pixel block R62 has progressed from the state shown in FIG. 12. From then on, the same processing is repeated.

<Summary>

In the image processor 5 according to the second preferred embodiment, a target block for one postfiltering of the post-filter 6 is a second pixel block (pixel block SB in FIG. 11) that is shifted from a first pixel block (macroblock MB in FIG. 11) by a predetermined number of pixels each horizontally and vertically. As shown in FIGS. 12 to 15, the post-filter 6 performs postfiltering sequentially on a plurality of second pixel blocks corresponding to a plurality of pixel blocks R61 to R63 aligned horizontally. Among a group of pixel signals of the first pixel block (region B6 in FIG. 13) inputted from the frequency inverse transform unit 7 to the post-filter 6, the pixel signals of the row not overlapping with the second pixel block (region B11 in FIG. 14) are stored in the memory unit 9. The memory unit 9 is not an internal memory of the post-filter 6 but an external memory connected externally to the post-filter 6. Consequently, the image processor 5 according to the second preferred embodiment does not require a line memory with capacity in accordance with the length of a row in a pixel plane to be provided within the post-filter 6. Thus circuit size of the post-filter 6 is reduced.

Furthermore, the post-filter 6 of the image processor 5 according to the second preferred embodiment includes the memory unit 8. Among a group of pixel signals of the first pixel block (region B6 in FIG. 13) inputted from the frequency inverse transform unit 7 to the post-filter 6, the pixel signals (region B10 in FIG. 14) of a column not overlapping with the second pixel block are stored in the memory unit 8. Thus the image processor 5 according to the second preferred embodiment does not require the pixel signals of the pixel block R62 to be inputted again from the frequency inverse transform unit 7 to the post-filter 6 for processing the region B6, when processing the second pixel block corresponding to the pixel block R63 subsequent to the pixel block R62. Thus the amount of pixel signals transmitted from the frequency inverse transform unit 7 to the post-filter 6 is reduced. The memory unit 8 has only a slight influence on increase in the circuit size of the image processor 5, since the capacity thereof is independent of the length of a pixel plane.

<Modification>

Figure 16:
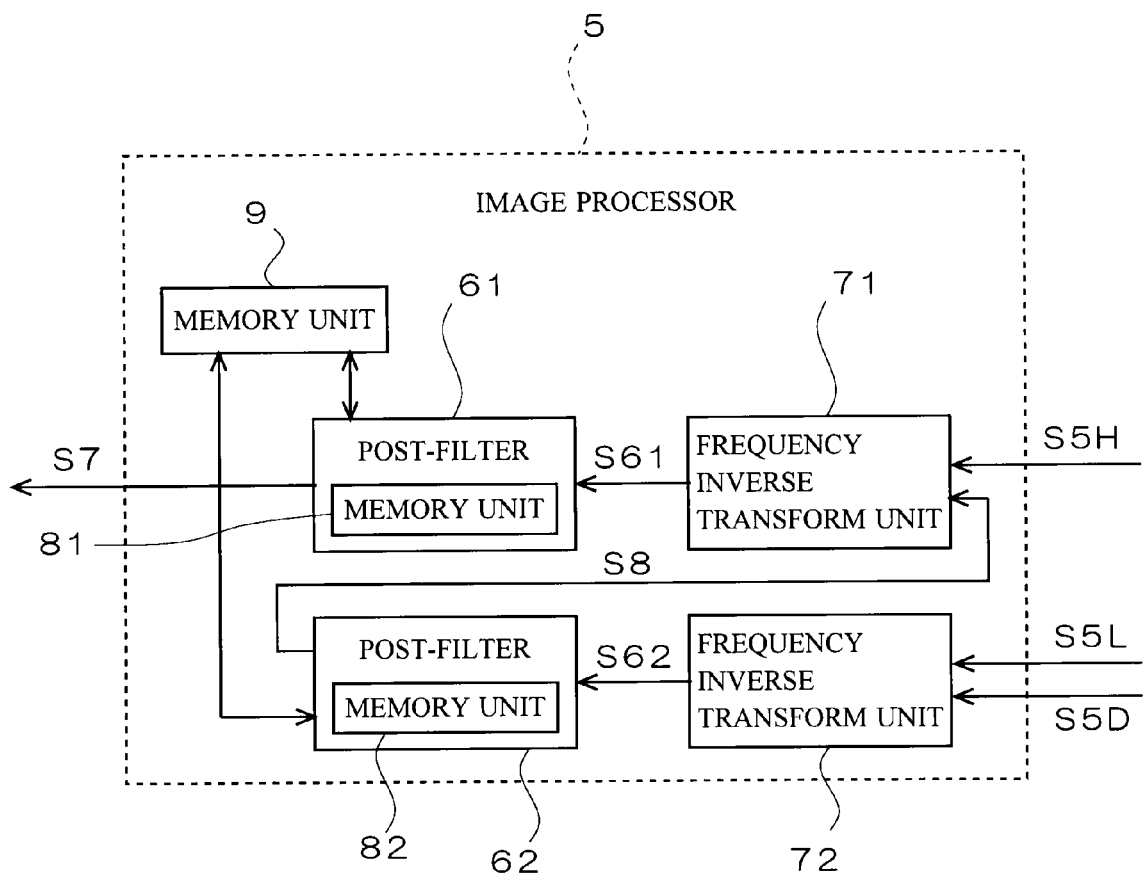
FIG. 16 is a block diagram showing a configuration of an image processor according to a modification of the second preferred embodiment.
Figure 17:
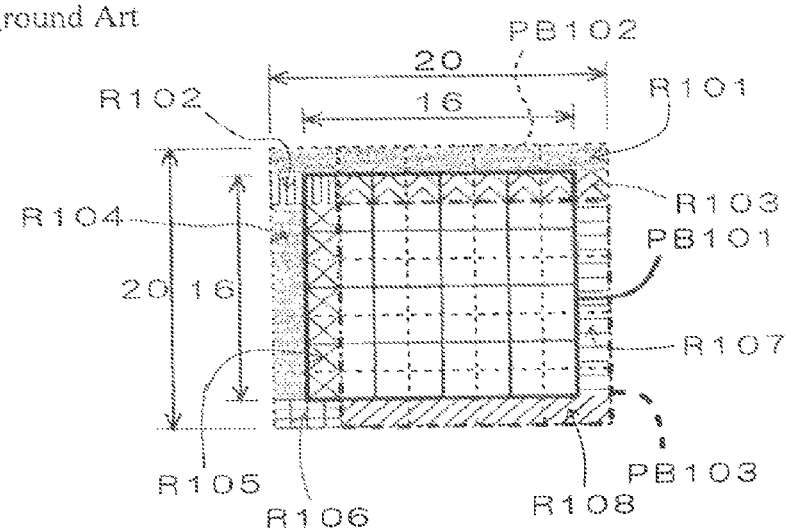
FIG. 17 illustrates prefiltering in HD Photo.
Figure 18:
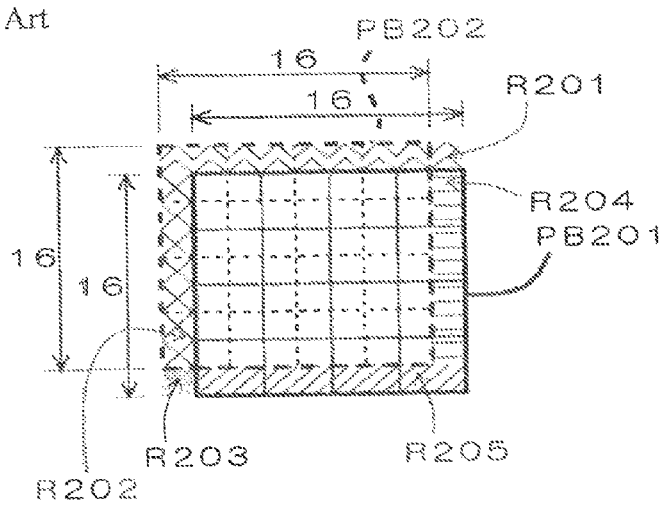
FIG. 18 illustrates postfiltering in HD Photo.

FIG. 16 is a block diagram showing a configuration of an image processor 5 according to a modification of the second preferred embodiment. The image processor 5 includes a post-filter 61 and a frequency inverse transform unit 71 of a first stage, a post-filter 62 and a frequency inverse transform unit 72 of a second stage, and a memory unit 9 externally connected to the post-filters 61 and 62. The post-filter 61 includes a memory unit 81, and the post-filter 62 includes a memory unit 82. The memory units 81 and 82 are equivalent to the memory unit 8 shown in FIG. 10.

A signal S5H of highpass component is inputted from a preceding processing unit in the image processor 5 to the frequency inverse transform unit 71. In addition, a signal S5L of lowpass component and a signal S5D of direct current component are inputted from the preceding processing unit in the image processor 5 to the frequency inverse transform unit 72. The frequency inverse transform unit 72 performs frequency inverse transform on the signals S5L and S5D, and outputs a signal S62 equivalent to direct current component of the first stage. The post-filter 62 performs postfiltering on the signal S62, and outputs a signal S8 after postfiltering. The signal S8 is inputted to the frequency inverse transform unit 71.

The frequency inverse transform unit 71 performs frequency inverse transform on the signals S5H and S8, and outputs a pixel signal S61. The post-filter 61 performs post-filtering on the signal S61, and outputs a pixel signal S7 after postfiltering.

Similar to the pre-filter 6 shown in FIG. 10, a line memory with capacity in accordance with the length of a row in a pixel plane is omitted from the post-filters 61 and 62.

In this way, the invention according to the second preferred embodiment can be applied to a case where postfiltering is performed in both first and second stages, and the same effect as the above is achieved.

While the invention has been described in detail, the foregoing description is in all aspects illustrative and not restrictive. It is understood that numerous other modifications and variations can be devised without departing from the scope of the invention.

What is claimed is:

1. An image processor comprising:
a frequency transform unit performing frequency transform on a first pixel block as a target block; and
a pre-filter performing prefiltering with a region which overlaps with plural unit regions for processing by the frequency transform unit as a unit region for processing, before frequency transform is performed,
the pre-filter performing prefiltering on a second pixel block being a predetermined number of pixels each larger horizontally and vertically than the first pixel block as a target block,
said second pixel block being a plurality of second pixel blocks,
the pre-filter performing prefiltering sequentially on the plurality of second pixel blocks aligned horizontally, wherein
a number of pixel signals in a vertical direction within a group of pixel signals continuously inputted to the pre-filter for prefiltering is equal to a number of rows in the second pixel block.

2. The image processor according to claim 1, wherein
the pre-filter includes a memory unit, and
among a group of pixel signals after prefiltering obtained by prefiltering one of the plurality of second pixel blocks, pixel signals of a column overlapping with the first pixel block corresponding to a subsequent second pixel block are stored in the memory unit.

3. An image processor comprising:
a frequency inverse transform unit performing frequency inverse transform on a first pixel block as a target block;
a post-filter performing postfiltering with a region which overlaps with plural unit regions for processing by the frequency inverse transform unit as a unit region for processing, after frequency inverse transform is performed; and
a first memory unit externally connected to the post-filter,
the post-filter performing postfiltering on a second pixel block being shifted from the first pixel block by a predetermined number of pixels each horizontally and vertically as a target block,
said second pixel block being a plurality of second pixel blocks,
the post-filter performing postfiltering sequentially on the plurality of second pixel blocks aligned in a vertical direction, wherein
among a group of pixel signals of the first pixel block inputted from the frequency inverse transform unit to the post-filter, pixel signals of a row not overlapping with the second pixel block are stored in the first memory unit.

4. The image processor according to claim 3, wherein,
the post-filter includes a second memory unit, and
among a group of pixel signals of the first pixel block inputted from the frequency inverse transform unit to the post-filter, pixel signals of a column not overlapping with the second pixel block are stored in the second memory unit.

* * * * *